(12) United States Patent
Yanagihara et al.

(10) Patent No.: US 8,009,252 B2
(45) Date of Patent: Aug. 30, 2011

(54) LIQUID CRYSTAL DISPLAY DEVICE

(75) Inventors: Masayuki Yanagihara, Mobara (JP);
Yoshiaki Sakurai, Kujukuri (JP);
Masato Sawahata, Ichihara (JP)

(73) Assignee: Hitachi Displays, Ltd., Chiba (JP)

( * ) Notice: Subject to any disclaimer, the term of this patent is extended or adjusted under 35 U.S.C. 154(b) by 177 days.

(21) Appl. No.: 12/398,348

(22) Filed: Mar. 5, 2009

(65) Prior Publication Data
US 2009/0225258 A1   Sep. 10, 2009

(30) Foreign Application Priority Data
Mar. 7, 2008   (JP) .................................. 2008-057537

(51) Int. Cl.
*G02F 1/1335*   (2006.01)
(52) U.S. Cl. .......................................... 349/96; 349/12
(58) Field of Classification Search ........................ None
See application file for complete search history.

(56) References Cited

U.S. PATENT DOCUMENTS

2001/0020985 A1* 9/2001 Hinata ............................. 349/12
2002/0154254 A1* 10/2002 Tasaki et al. .................... 349/58

FOREIGN PATENT DOCUMENTS

JP   09-318932   12/1997
* cited by examiner

*Primary Examiner* — Tina M Wong
(74) *Attorney, Agent, or Firm* — Antonelli, Terry, Stout & Kraus, LLP.

(57) ABSTRACT

A liquid crystal display device of the present invention includes: a liquid crystal layer that is held between first and second substrates; an upper polarization plate that is disposed on an outer side of the first substrate; and a protection plate that is fixed to and disposed on an outer side of the upper polarization plate, wherein the upper polarization plate has a structure where an outer peripheral portion of the upper polarization plate is not fixed to the protection plate.

11 Claims, 8 Drawing Sheets

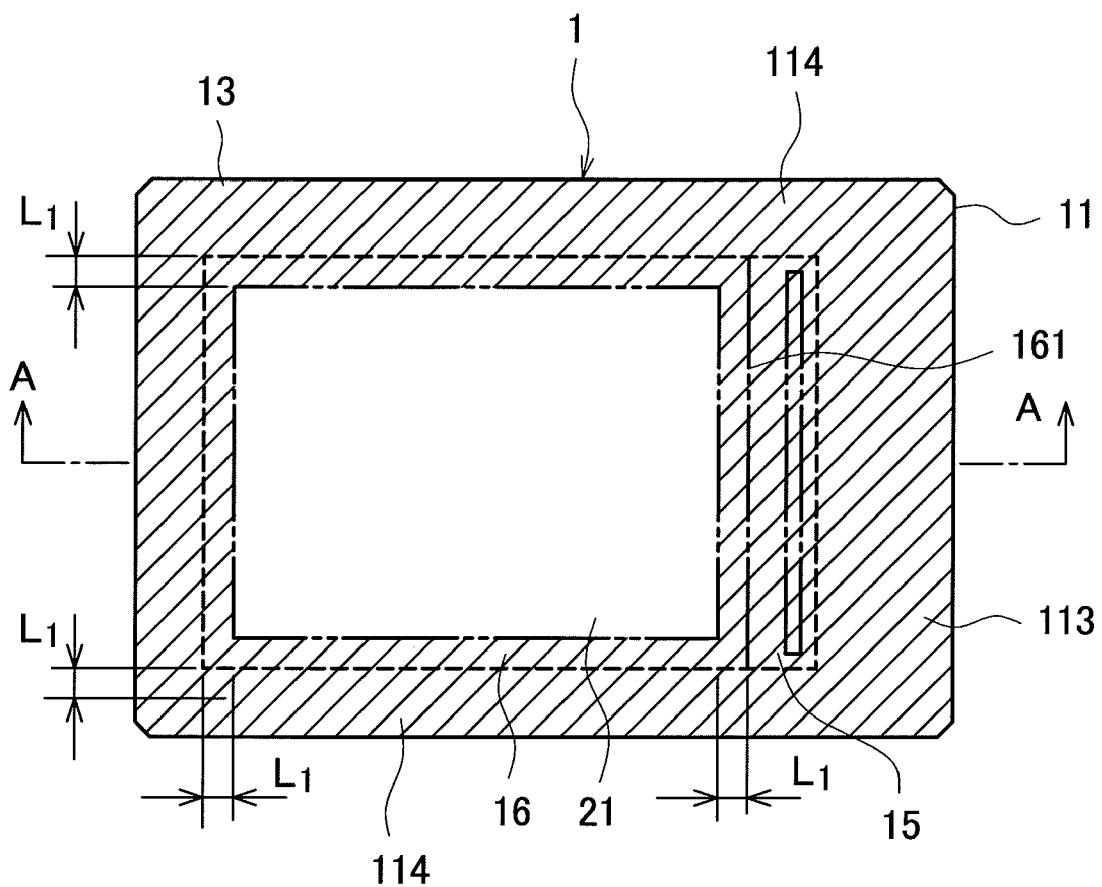

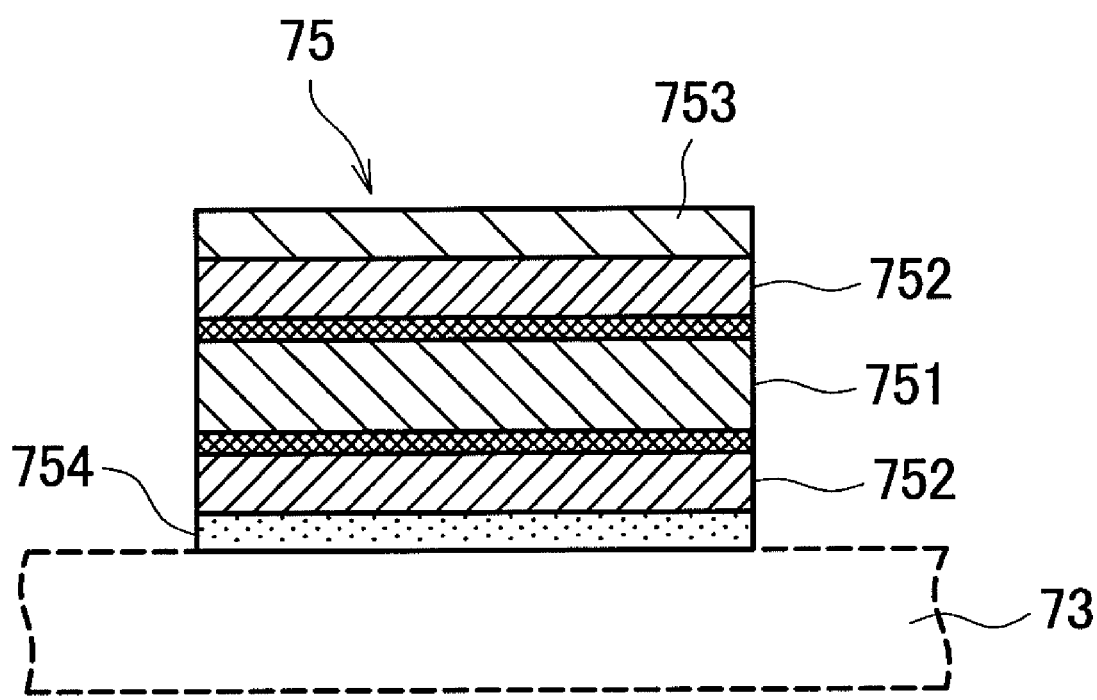

LIQUID CRYSTAL DISPLAY DEVICE

CROSS-REFERENCE TO RELATED APPLICATION

The disclosure of Japanese Patent Application No. 2008-57537 filed on Mar. 7, 2008 including the specification, drawings and abstract is incorporated herein by reference in its entirety.

BACKGROUND OF THE INVENTION

1. Field of the Invention

The present invention pertains to a liquid crystal display device and particularly relates to the suppression of brightness non-uniformity.

2. Description of the Related Art

In recent years, liquid crystal display devices are heavily used as display devices. Particularly liquid crystal display devices are used as display portions in television receivers, portable terminals and in-vehicle devices because liquid crystal display devices are thin, lightweight and conserve electrical power.

In these liquid crystal display devices, particularly in the liquid crystal display devices for portable terminals, demands for ensuring outdoor visibility, improving the strength of and thinning a liquid crystal module are strong because of mobile use.

However, in the midst of these demands, there are cases where conflicting demands are made in terms, for example, of improving the strength of and thinning a liquid crystal module. For example, in thinning, thinning liquid crystal module configural members is unavoidable, and there is tendency to usually lead to a drop in strength and run counter to improving the strength and ensuring the safety of the liquid crystal module.

Further, there is a risk that thinning liquid crystal module configural members will lead to deformation of the configural members, and there have been problems in that display quality drops because of the occurrence of brightness non-uniformity, for example, that accompanies deformation and it becomes difficult to ensure outdoor visibility.

In addition to these problems, ensuring safety with respect to mobile users has become an important issue because of mobile use. Examples of publications that disclose this type of liquid crystal display device include Japanese Patent Application Laid-Open Publication No. 9-318932 (patent document 1).

SUMMARY OF THE INVENTION

The liquid crystal display device described in patent document 1 relates to in-vehicle use such as handwritten input and navigation systems, and configurations pertaining to a liquid crystal display panel and a transparent protection plate are disclosed.

FIG. 7A and FIG. 7B are a schematic cross-sectional diagram and an enlarged cross-sectional diagram of relevant portions for describing a conventional liquid crystal display device relating to patent document 1, respectively. In FIG. 7A and FIG. 7B, a TFT substrate 72 and a color filter (CF) substrate 73 that hold a liquid crystal layer 71 have similar shapes and are substantially rectangular. Moreover, the TFT substrate 72 includes a mounting portion 721 that projects further than an end surface 731 of the CF substrate 73, and the TFT substrate 72 is formed so as to be larger than the CF substrate 73. Further, a lower polarization plate 74 and an upper polarization plate are respectively disposed on the outer sides of the TFT substrate 72 and the CF substrate 73.

A backlight unit 76 including a combination of a light source, a light guide plate, a diffusion plate and a lens is disposed in a position adjacent to the outer side of the lower polarization plate 74, and a driver 77 such as a drive circuit is disposed on the upper surface of the mounting portion 721 of the TFT substrate 72. Reference numeral 78 represents a liquid crystal module.

A protection plate 80 including a transparent plate such as a glass plate or an acrylic plate, for example, is disposed on the upper portion of a display surface on the outer side of the upper polarization plate 75. This protection plate 80 covers the entire liquid crystal module 78, and its entire surface is adhered and fixed to the outer surface of the upper polarization plate 75 via an adhesive 81.

The liquid crystal display device shown in FIG. 7A and FIG. 7B has a configuration where the liquid crystal module 78 is covered by the protection plate 80 such that the liquid crystal module 78 is protected from outside shock. Consequently, usually the protection plate 80 has a plate thickness of about 1 mm or greater, which is several times to several tens of times greater in comparison to the CF substrate 73 and the TFT substrate 72.

Incidentally, in a liquid crystal display device of a configuration equipped with a protection plate such as shown in FIG. 7A and FIG. 7B, the problem that brightness non-uniformity occurs in the peripheral portions of the screen has arisen. It has become clear that one of the factors of this problem is that the CF substrate 73 deforms into a shape indicated by dotted line 732 in FIG. 7B such that the interval between the CF substrate 73 and the TFT substrate 72 displaces in accompaniment therewith. As a result of investigating the reasons for deformation of the CF substrate 73, it has become clear that deformation results from the shape of a polarizer layer of the upper polarization plate 75.

The configuration of a usual polarization plate including this upper polarization plate 75 takes as its basic structure a three-layer structure such as schematically shown in FIG. 8. That is, as shown in FIG. 8, the upper polarization plate 75 has a configuration where the outer sides of a polarizer layer 751 are held between protection film layers 752 and where a hard coat layer 753 and an adhesive layer 754 are disposed on the outer sides of the protection film layers 752.

In the polarization plate of this configuration, deformation where the polarizer layer 751 contracts in a dew condensation test (temperature cycle test under high humidity) occurs, and the thickness of the polarization plate increases in the vicinity of the distal end of the polarization plate in accompaniment therewith. This phenomenon is schematically shown in FIG. 7B.

In FIG. 7B, the portion of the distal end of the polarizer layer 751 that has contracted forms a buildup portion 755, and the thickness of the polarization plate including the protection film layer 753 increases at the portion of this buildup portion 755. In accompaniment with this increase in the thickness of the polarization plate, a force in the outside direction acts on both the protection plate 80 and the CF substrate 73, but it becomes difficult for the protection plate 80 to deform because of the aforementioned plate thickness relationship, and the force works in a direction where it causes the CF substrate 73 to deform. As a result, the CF substrate 73 deforms as indicated by the dotted line 732 and becomes a factor that displaces the interval between the CF substrate 73 and the TFT substrate 72 and generates brightness non-uniformity in the peripheral portions of the screen.

The occurrence of brightness non-uniformity leads to a drop in display quality, and in relation to ensuring visibility and ensuring the strength of the liquid crystal module, the problem that needs to be solved remains.

The present invention has been made in view of the above circumstance, and it is an object thereof to provide a liquid crystal display device, and particularly a liquid crystal display device for a portable terminal, that suppresses the occurrence of brightness non-uniformity and makes it possible to ensure outdoor visibility, improve the strength of and thin a liquid crystal module, and ensure safety.

In order to achieve the above object, a liquid crystal display device according to the present invention comprises: a liquid crystal module where a liquid crystal layer is interposed between a pair of opposing substrates and where polarization plates are disposed on outer sides of the substrates; and a transparent protection plate of a dimension covering the liquid crystal module and is fixed and disposed so as to cover the polarization plate, wherein the polarization plate has a structure where an outer peripheral portion of the polarization plate is not fixed to the protection plate or the substrate.

According to the invention, the outer peripheral portion of the polarization plate is structured to be not fixed to the protection plate that holds the outer peripheral portion or the substrate, so that a force in the outside direction which accompanies an increase in the thickness of the polarization plate is absorbed by a void between the polarization plate and the protection plate or the substrate and does not cause the occurrence of deformation of the CF substrate. Consequently, the distance between the CF substrate and the TFT substrate can be kept at a constant, the occurrence of brightness non-uniformity can be suppressed, visibility can be ensured, and thinning and safety can be ensured. Further, according to the invention of the present application, because the outer surface of the protection plate is covered by the shatterproof sheet, visibility, thinning and safety can be ensured.

BRIEF DESCRIPTION OF THE DRAWINGS

FIG. 2 is a plan diagram of relevant portions of FIG. 1;

FIG. 8 is a schematic cross-sectional diagram describing the configuration of a polarization plate.

DETAILED DESCRIPTION OF THE INVENTION

Below, specific modes for implementing the present invention will be described in detail with reference to drawings of embodiments.

Embodiment 1

Figure 1:
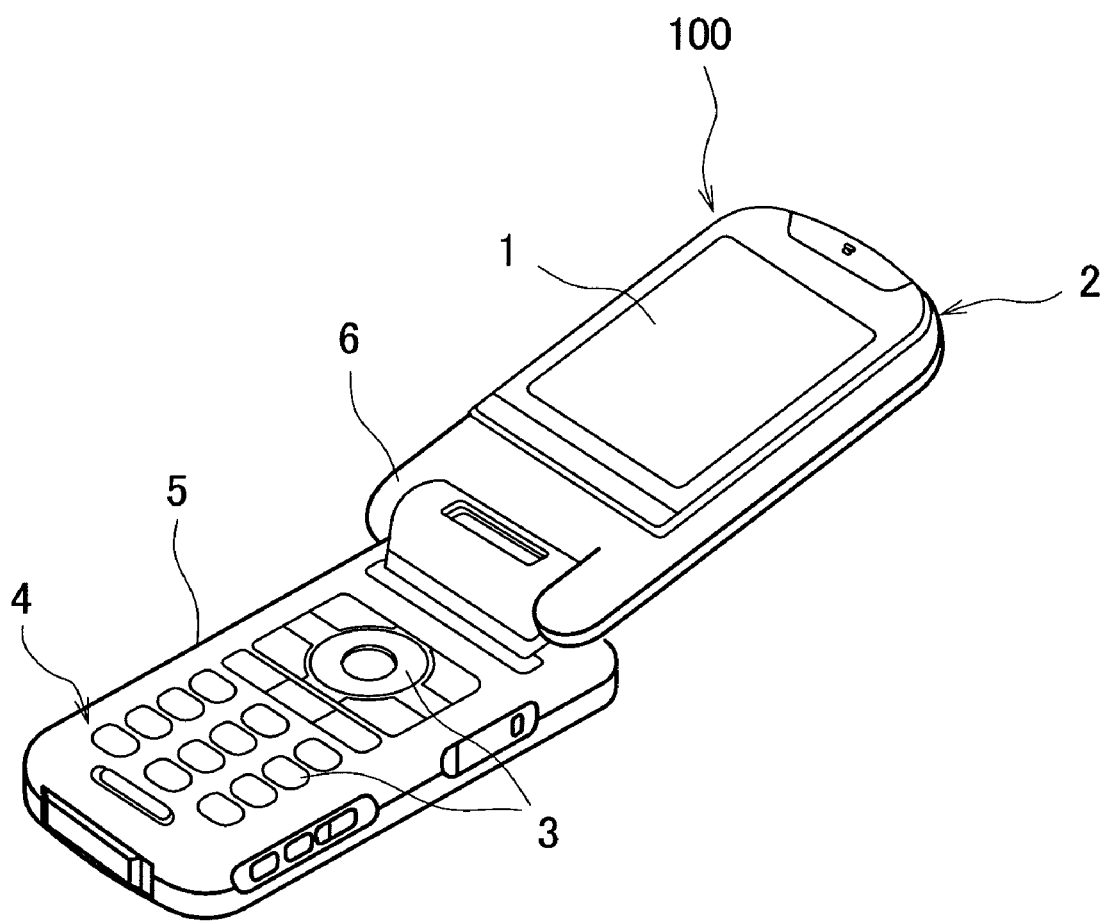
FIG. 1 is a schematic perspective diagram showing an overview of the overall configuration of a mobile telephone pertaining to an embodiment of a liquid crystal display device according to the present invention.
Figure 3A:
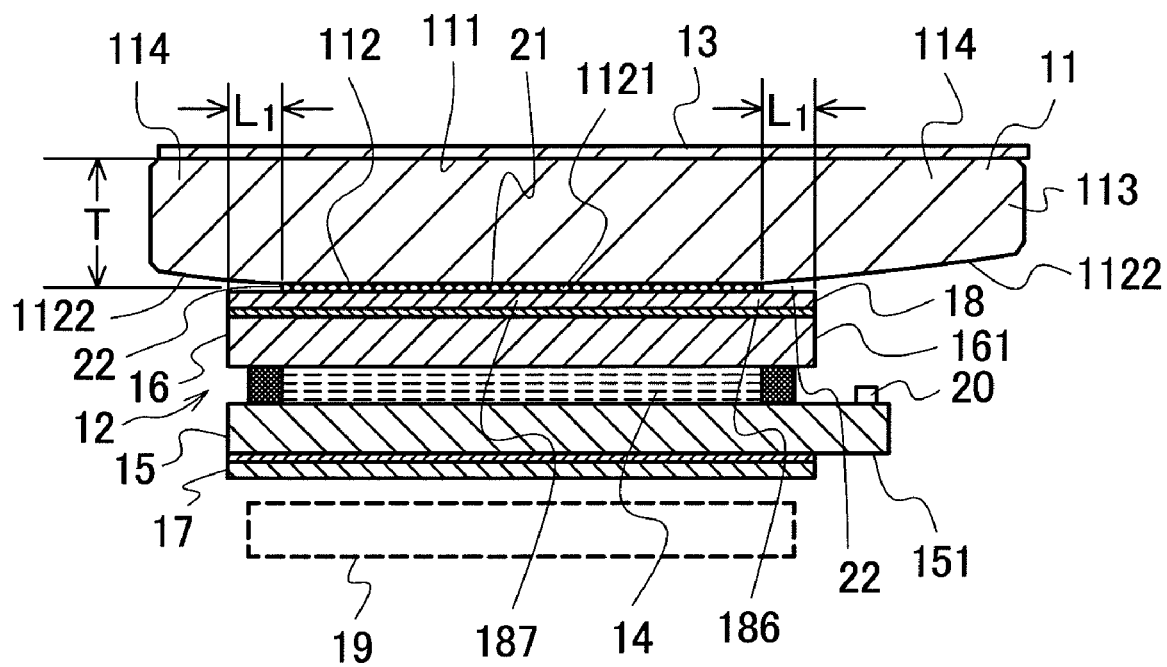
FIG. 3A is a schematic cross-sectional diagram along line A-A of FIG. 2.
Figure 3B:
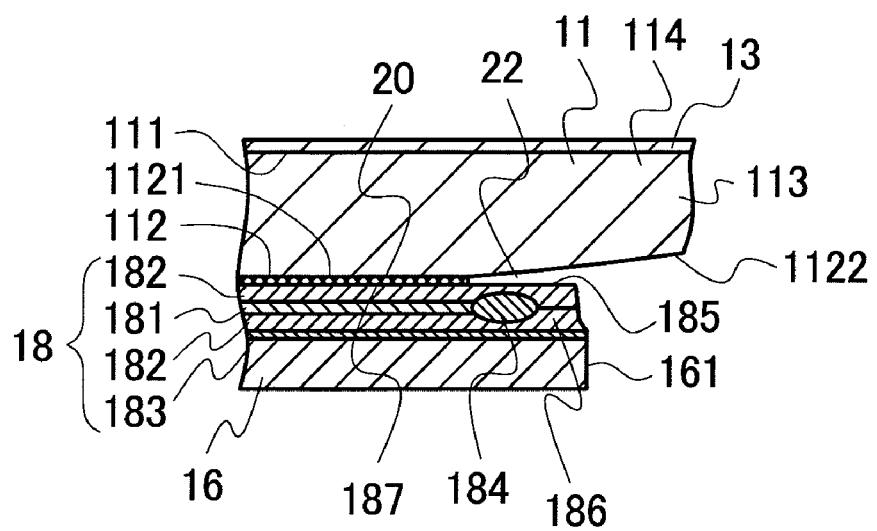
FIG. 3B is an enlarged cross-sectional diagram of relevant portions of FIG. 3A.

FIG. 1 to FIG. 3A and FIG. 3B are schematic diagrams describing an embodiment of a liquid crystal display device according to the present invention. FIG. 1 is a perspective diagram showing an overview of the overall configuration of a mobile telephone pertaining to an embodiment of the present invention. FIG. 2 is a plan diagram of relevant portions of FIG. 1. FIG. 3A is a schematic cross-sectional diagram along line A-A of FIG. 2, and FIG. 3B is an enlarged cross-sectional diagram of relevant portions of FIG. 3A. Turning now to FIG. 1 to FIG. 3A and FIG. 3B, first, a mobile telephone 100 whose entirety is shown in a perspective diagram in FIG. 1 has a configuration where a first casing 2 equipped with a liquid crystal display portion 1 that becomes a display surface and a second casing 5 equipped with an operation portion 4 that includes operation buttons 3 are foldably joined together by a hinge portion 6.

The liquid crystal display portion 1 that becomes the display surface is, as shown in FIG. 2, FIG. 3A and FIG. 3B, configured such that a protection plate 11 that comprises glass is disposed on the display surface side of a liquid crystal module 12. A shatterproof sheet 13 is tightly adhered and joined to an outer surface 111 of this protection plate 11. This shatterproof sheet 13 covers substantially the entire surface of the outer surface 111. The liquid crystal module 12 includes a first substrate (below, called a "TFT substrate") 15 and a second substrate (below, called a "CF substrate") 16 that are disposed facing each other, with a liquid crystal layer 14 being held therebetween. Further, a lower polarization plate 17 of a somewhat smaller area than that of the TFT substrate 15 is disposed on the outer side of the TFT substrate 15.

An upper polarization plate 18 of substantially the same area as that of the CF substrate 16 is disposed on the outer side of the CF substrate 16. This upper polarization plate 18 has a configuration where, similar to the polarization plate shown in FIG. 8, the outer sides of a polarizer layer 181 are sandwiched by protection film layers 182 and where an unillustrated hard coat layer and an adhesive layer 183 are disposed on the outer sides of the protection film layer 182. Further, reference numeral 184 is a buildup portion.

Further, the TFT substrate 15 and the CF substrate 16 have substantially similar shapes. The TFT substrate 15 is equipped with a mounting portion 151 where one side of the TFT substrate 15 projects more than an end surface 161 of the CF substrate 16.

Moreover, a backlight unit 19 is disposed below the liquid crystal module 12, and a driver 20 such as a drive circuit is mounted on the upper surface of the mounting portion 151 of the TFT substrate 15.

The liquid crystal module 12 of this configuration and the protection plate 11 are configured such that a junction portion 187 of the upper polarization plate 18 excluding an outer peripheral portion 186 on an outer surface 185 side and a junction portion 1121 of an inner surface 112 of the protection plate 11 which faces the junction portion 187 are adhered to each other by an adhesive 21. This adhesion is, for example, performed by a combination of irradiation with UV light and thermal curing.

A dimension L1 of the outer peripheral portion 186 that is not adhered to the protection plate 11 may be determined by the dimensions of the protection plate 11, the CF substrate and the upper polarization plate 18, but usually it is necessary for the dimension L1 to be about 0.8 mm to 3 mm from the outer end surface toward the center. When the dimension L1 is narrower than the range, it becomes difficult to absorb displacement of the polarization plate, and when the dimension L1 is wider than the range, the display area becomes small.

The protection plate 11 has a substantially similar shape to that of the CF substrate 16. A plate thickness T of the protection plate 11 is about several times to ten-odd times that of the CF substrate 16, and the area of the protection plate 11 is larger than that of the CF substrate 16. Particularly on the side of the mounting portion 151 of the TFT substrate 15, the protection plate 11 is equipped with a projecting portion 113 that covers the mounting portion 151 and extends further than the mounting portion 151.

Further, the protection plate 11 has a configuration where an inner surface 1122 of an end portion 114 that leads from the terminal end of the junction portion 1121 of the inner surface 112 to the distal end of the protection plate 11 recedes toward the outer surface 111. The receding shape of the inner surface 1122 of the end portion 114 has a tapered shape where the distal end of the protection plate 11 reaches a maximum receding amount, and a void 22 of a thickness equal to or greater than that of the adhesive 21 is formed even in the portion that faces the outer peripheral portion 186.

In embodiment 1, the void 22 is disposed between the outer peripheral portion 186 of the upper polarization plate 18 and the protection plate 11 to form a structure where the outer peripheral portion 186 of the upper polarization plate 18 and the protection plate 11 are not fixed to each other. Thus, a force in the outside direction that accompanies an increase in the thickness of the upper polarization plate 18 resulting from contraction of the outer peripheral portion 186 ends up being absorbed by the void 22 between the upper polarization plate 18 and the protection plate 11 and does not extend to the occurrence of deformation of the CF substrate 16. Consequently, the distance between the CF substrate 16 and the TFT substrate 15 can be kept at a constant, the occurrence of brightness non-uniformity can be suppressed, visibility can be ensured, and thinning and safety can be ensured. Further, because the outer surface 111 of the protection plate 11 is covered by the shatterproof sheet 13, the improvement of visibility, thinning and safety can be ensured.

Moreover, because the shatterproof sheet 13 is attached to the outer surface 111 of the protection plate 11, even if an external force were to act on the projecting portion 113 that projects in a cantilever state from the end surface 161 of the CF substrate 16, the occurrence of cracks can be circumvented because of the load bearing strength of the shatterproof sheet 13. Further, even if the projecting portion 113 were to break at the end surface 161 due to an even larger external force, the scattering of glass fragments can be prevented by the shatterproof sheet 13, and safety can be ensured.

Embodiment 2

Figure 4A:
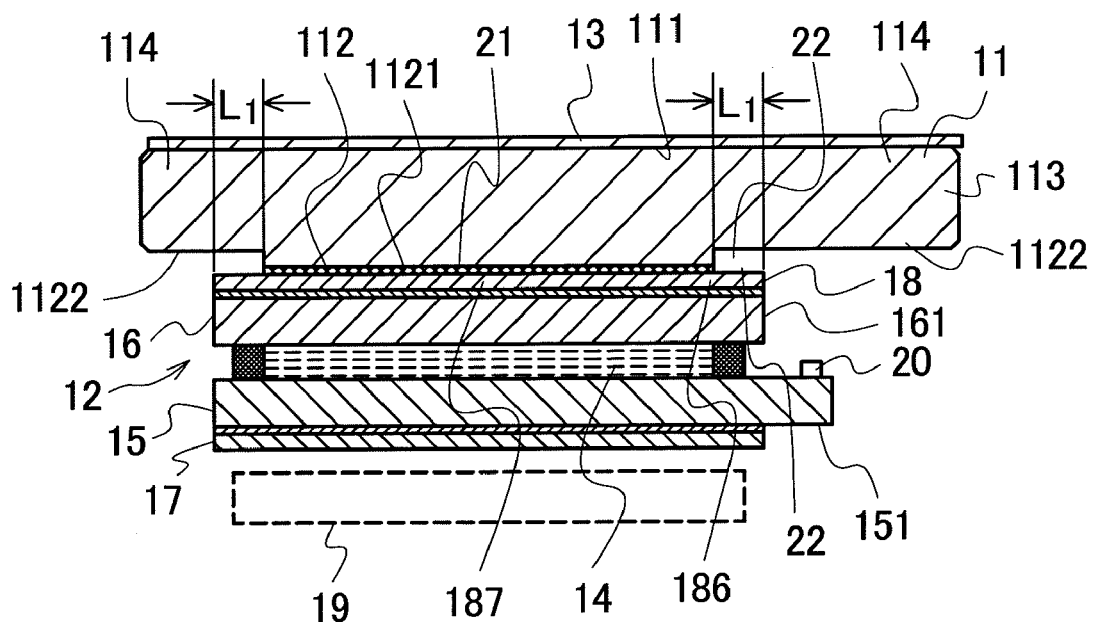
FIG. 4A and FIG. 4B are diagrams corresponding to FIG. 3A and FIG. 3B that describe another embodiment of the liquid crystal display device according to the present invention, with FIG. 4A being a schematic cross-sectional diagram and FIG. 4B being an enlarged cross-sectional diagram of relevant portions of FIG. 4A.
Figure 4B:
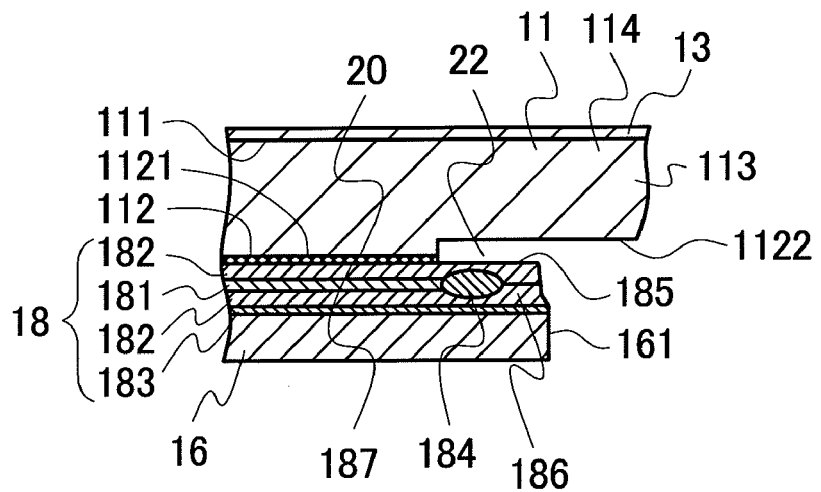

FIG. 4A and FIG. 4B are a schematic cross-sectional diagram and an enlarged cross-sectional diagram of relevant portions describing another embodiment of the liquid crystal display device according to the present invention and correspond respectively to FIG. 3A and FIG. 3B. The same reference numerals are given to portions in FIG. 4A and FIG. 4B that are the same as the portions in FIG. 3A and FIG. 3B. Turning now to FIG. 4A and FIG. 4B, the protection plate 11 has a configuration where the inner surface 1122 of the end portion 114 recedes toward the outer surface 111 so as to move away from the outer peripheral portion 186 of the upper polarization plate 18. The receding amount is set to be equal to or greater than the thickness of the adhesive 21, and the inner surface 1122 recedes substantially parallel to the outer surface 111 such that the end portion 114 has a thin plate shape in comparison to the junction portion.

In embodiment 2, machining of the receding shape becomes easy because the end portion 114 of the protection plate 11 has a thin plate shape with a substantially even thickness.

Embodiment 3

Figure 5A:
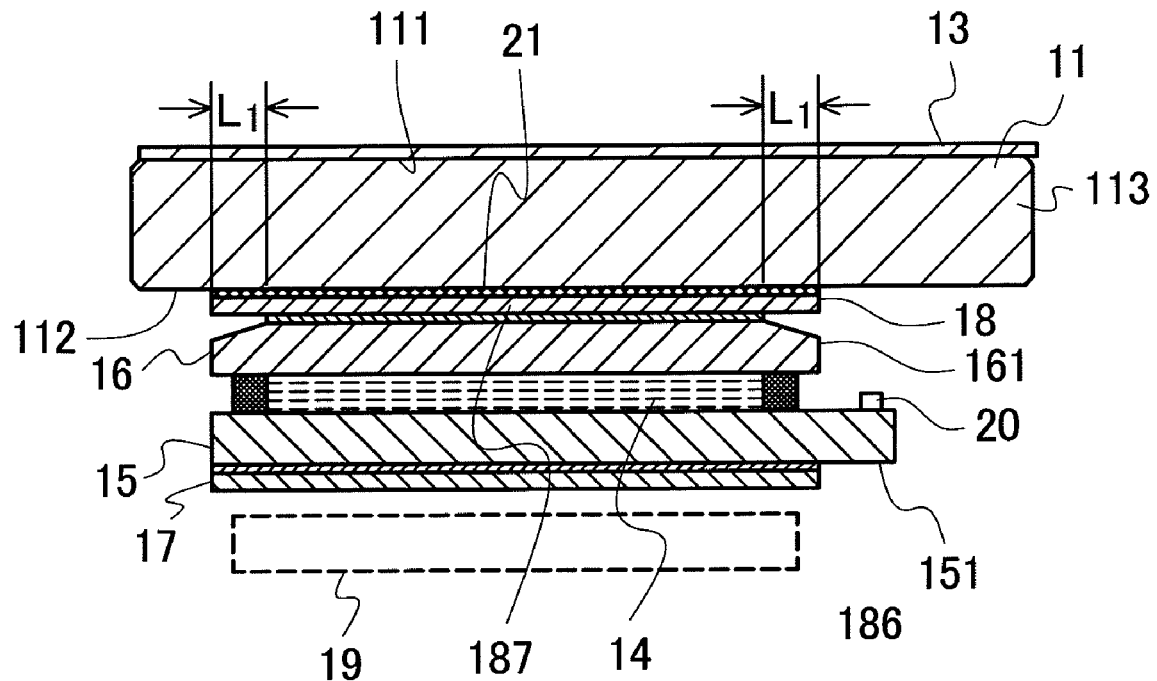
FIG. 5A and FIG. 5B are diagrams corresponding to FIG. 3A and FIG. 3B that describe another embodiment of the liquid crystal display device according to the present invention, with FIG. 5A being a schematic cross-sectional diagram and FIG. 5B being an enlarged cross-sectional diagram of relevant portions of FIG. 5A.
Figure 5B:
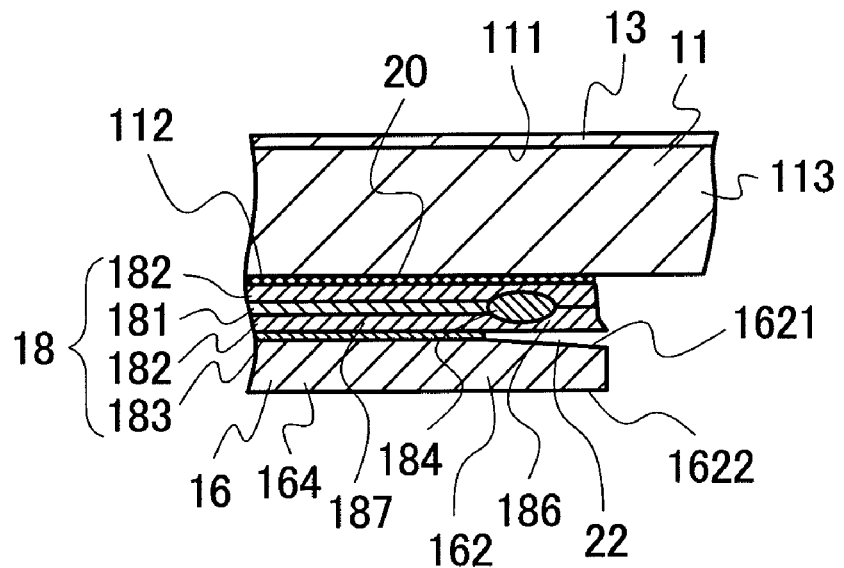

FIG. 5A and FIG. 5B are a schematic cross-sectional diagram and an enlarged cross-sectional diagram of relevant portions describing another embodiment of the liquid crystal display device according to the present invention and correspond respectively to FIG. 3A and FIG. 3B. The same reference numerals are given to portions in FIG. 5A and FIG. 5B that are the same as the portions in FIG. 3A and FIG. 3B. Turning now to FIG. 5A and FIG. 5B, the upper polarization plate 18 has a configuration where the adhesive layer 183 has been removed from the outer peripheral portion 186. Further, the CF substrate 16 has a configuration where an outer surface 1621 of an end portion 162 that leads from the portion facing the outer peripheral portion 186 to the distal end portion recedes toward an inner surface 1622.

The receding shape of the outer surface 1621 of the end portion 162 has a tapered shape where the distal end of the CF substrate 16 reaches a maximum receding amount, and the void 22 of a thickness equal to or greater than that of the adhesive layer 183 is formed even at the terminal end portion of the adhesive layer 183.

In embodiment 3, machining of the receding surface of the CF substrate 16 leads to substantially the same dimension across the entire circumference, and machining efficiency can be raised.

Embodiment 4

Figure 6A:
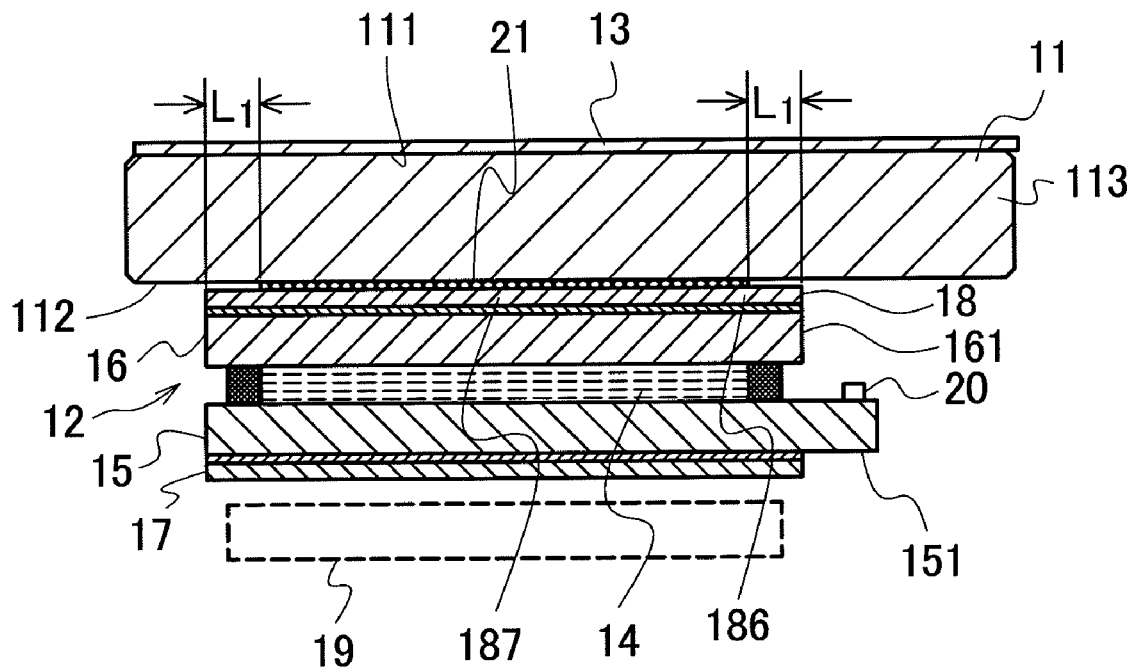
FIG. 6A and FIG. 6B are diagrams corresponding to FIG. 3A and FIG. 3B that describe another embodiment of the liquid crystal display device according to the present invention, with FIG. 6A being a schematic cross-sectional diagram and FIG. 6B being an enlarged cross-sectional diagram of relevant portions of FIG. 6A.
Figure 6B:
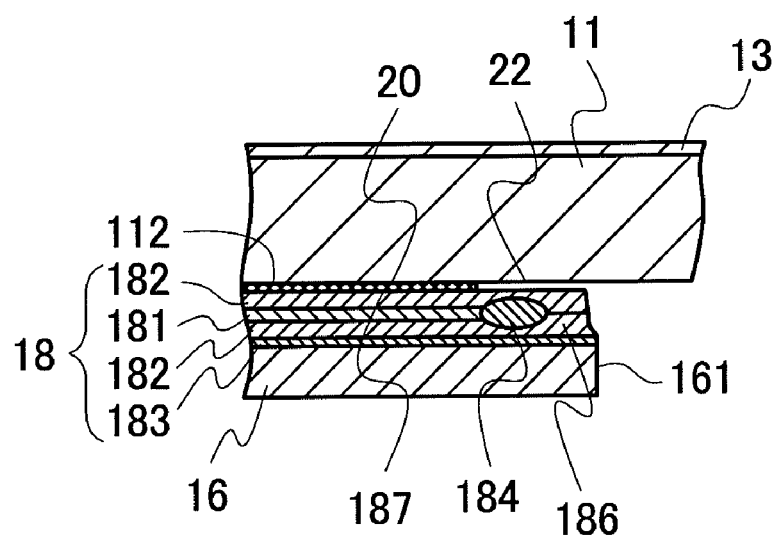
Figure 7A:
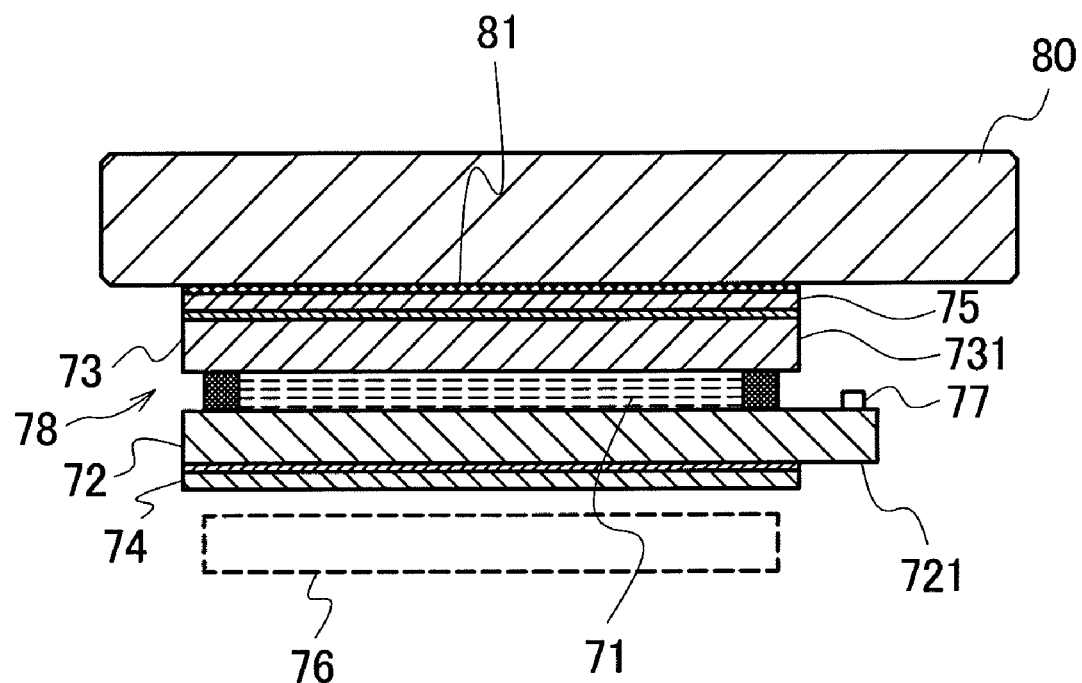
FIG. 7A and FIG. 7B are diagrams describing a conventional liquid crystal display device, with FIG. 7A being a schematic cross-sectional diagram and FIG. 7B being an enlarged cross-sectional diagram of relevant portions of FIG. 7A.
Figure 7B:
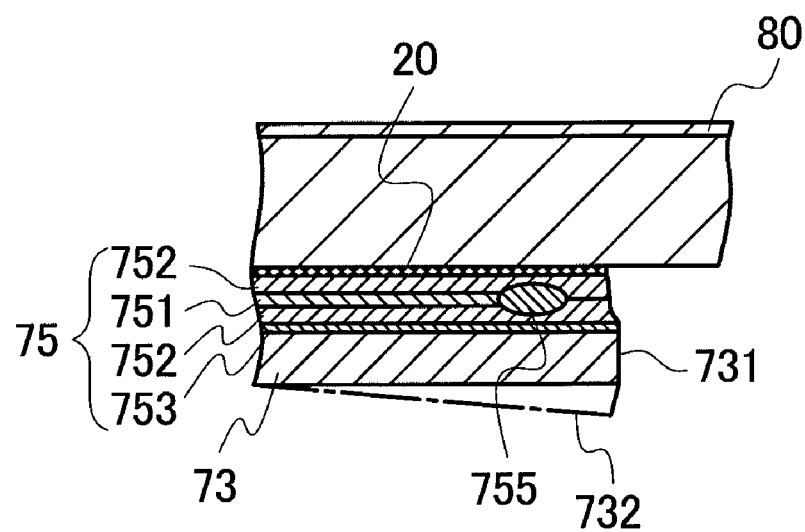

FIG. 6A and FIG. 6B are a schematic cross-sectional diagram and an enlarged cross-sectional diagram of relevant portions describing another embodiment of the liquid crystal display device according to the present invention and correspond respectively to FIG. 3A and FIG. 3B. The same reference numerals are given to portions in FIG. 6A and FIG. 6B that are the same as the portions in FIG. 3A and FIG. 3B. Turning now to FIG. 6A and FIG. 6B, the upper polarization plate 18 and the protection plate 11 have a configuration where the adhesive 21 on the portion of the outer peripheral portion 186 is eliminated, the void 22 that corresponds to the film thickness of the adhesive 21 is disposed at this portion, displacement of the portion of the outer peripheral portion 186 is absorbed by the void 22 portion, and deformation of the CF substrate 16 is suppressed.

In embodiment 4, deformation of the CF substrate 16 can be prevented and working efficiency can be improved, without having to particularly machine the protection plate 11 and the CF substrate 16, by specifying the application range of the adhesive 21.

Here, in embodiment 4, the application range of the adhesive 21 is specified, but the same effect is also obtained by specifying the application range of the adhesive layer 183.

What is claimed is:

1. A liquid crystal display device comprising:
   a liquid crystal module equipped with a tabular first substrate, a tabular second substrate that has a smaller area than that of the first substrate, a liquid crystal layer that is held between the first and second substrates, a lower polarization plate that is disposed on an outer side of the first substrate and an upper polarization plate that is disposed on an outer side of the second substrate; and
   a transparent protection plate that has a larger area than that of the second substrate and is fixedly attached to and disposed on an outer side of the upper polarization plate;
   wherein the upper polarization plate has a structure where an outer peripheral portion of the upper polarization plate is not fixed to the protection plate or the second substrate that faces this outer peripheral portion;
   wherein an inner surface of the protection plate that faces the outer peripheral portion of the upper polarization plate recedes toward an outer surface of the protection plate and faces, without contacting, the upper polarization plate; and
   wherein the inner surface of the protection plate that faces the outer peripheral portion of the upper polarization plate has a tapered shape.

2. The liquid crystal display device of claim 1, wherein an outer surface of the second substrate that faces the outer peripheral portion recedes toward the first substrate and has a structure where the outer surface of the second substrate is not fixed to the outer peripheral portion.

3. The liquid crystal display device of claim 1, wherein the protection plate is a glass plate.

4. The liquid crystal display device of claim 1, wherein a shatterproof sheet made of a transparent resin material through which UV light is capable of being transmitted is tightly adhered and joined to substantially the entire surface of the outer surface of the protection plate.

5. A liquid crystal display device comprising:
   a liquid crystal module equipped with a tabular first substrate, a tabular second substrate that has a smaller area than that of the first substrate, a liquid crystal layer that is held between the first and second substrates, a lower polarization plate that is disposed on an outer side of the first substrate and an upper polarization plate that is disposed on an outer side of the second substrate; and
   a transparent protection plate that has a larger area than that of the second substrate and is fixedly attached to and disposed on an outer side of the upper polarization plate;
   wherein the upper polarization plate has a structure where an outer peripheral portion of the upper polarization plate is not fixed to the protection plate or the second substrate that faces this outer peripheral portion;
   wherein an inner surface of the protection plate that faces the outer peripheral portion of the upper polarization plate recedes toward an outer surface of the protection plate and faces, without contacting, the upper polarization plate; and
   wherein the inner surface of the protection plate that faces the outer peripheral portion of the upper polarization plate recedes substantially parallel to the outer surface, and the receding portion has a thin plate shape.

6. The liquid crystal display device of claim 5, wherein an outer surface of the second substrate that faces the outer peripheral portion recedes toward the first substrate and has a structure where the outer surface of the second substrate is not fixed to the outer peripheral portion.

7. The liquid crystal display device of claim 5, wherein the protection plate is a glass plate.

8. The liquid crystal display device of claim 5, wherein a shatterproof sheet made of a transparent resin material through which UV light is capable of being transmitted is tightly adhered and joined to substantially the entire surface of the outer surface of the protection plate.

9. A liquid crystal display device comprising:
   a liquid crystal module equipped with a tabular first substrate, a tabular second substrate that has a smaller area than that of the first substrate, a liquid crystal layer that is held between the first and second substrates, a lower polarization plate that is disposed on an outer side of the first substrate and an upper polarization plate that is disposed on an outer side of the second substrate; and
   a transparent protection plate that has a larger area than that of the second substrate and is fixedly attached to and disposed on an outer side of the upper polarization plate;
   wherein the upper polarization plate has a structure where an outer peripheral portion of the upper polarization plate is not fixed to the protection plate or the second substrate that faces this outer peripheral portion;
   wherein an outer surface of the second substrate that faces the outer peripheral portion recedes toward the first substrate and has a structure where the outer surface of the second substrate is not fixed to the outer peripheral portion; and
   wherein the outer surface of the second substrate that faces the outer peripheral portion of the upper polarization plate has a tapered shape.

10. The liquid crystal display device of claim 9, wherein the protection plate is a glass plate.

11. The liquid crystal display device of claim 9, wherein a shatterproof sheet made of a transparent resin material through which UV light is capable of being transmitted is tightly adhered and joined to substantially the entire surface of the outer surface of the protection plate.

* * * * *